United States Patent [19]

Careglio

[11] 4,336,584
[45] Jun. 22, 1982

[54] AUTORESONANT STATIC CONVERTER
[75] Inventor: Giuseppe Careglio, Turin, Italy
[73] Assignee: WABCO Westinghouse Compagnia Freni S.p.A., Turin, Italy
[21] Appl. No.: 135,049
[22] Filed: Mar. 28, 1980
[30] Foreign Application Priority Data
  Apr. 4, 1979 [IT] Italy ................. 67700 A/79
[51] Int. Cl.³ ............... H02M 3/315; H02M 7/515
[52] U.S. Cl. ........................... 363/28; 363/96; 363/136
[58] Field of Search ............... 363/15, 16, 17, 75, 363/96, 136, 27, 28

[56] References Cited
U.S. PATENT DOCUMENTS

| | | | |
|---|---|---|---|
| 3,412,309 | 11/1968 | Boonstra | 363/57 |
| 3,559,029 | 1/1971 | Yarema | 363/16 |
| 3,569,819 | 3/1971 | Martzioff | 363/58 |
| 3,760,258 | 9/1973 | Percorini et al. | 363/56 |
| 3,761,796 | 9/1973 | Jensen | 363/16 |
| 4,028,610 | 6/1977 | Cord'Homme | 363/96 |
| 4,079,444 | 3/1978 | Kuhn | 363/56 |

FOREIGN PATENT DOCUMENTS 648970  2/1979  U.S.S.R. .................. 363/15

Primary Examiner—A. D. Pellinen
Attorney, Agent, or Firm—A. G. Williamson, Jr.

[57] ABSTRACT

An LC series resonant regulator is connected across the output of the inverter circuit of a static converter apparatus to vary the output voltage level as the inverter operating frequency varies from a preselected frequency at which the regulator circuit is tuned. The load is coupled across the capacitor element of the regulator and a level detector coupled across the load input. This detector registers variations of the input to the load from a predetermined desired level of load voltage and supplies a feedback signal, indicative of any detected variations, to the control circuit for the inverter circuit element. This control circuit is responsive to a feedback signal to vary the operating frequency of the static inverter so that the regulator varies the output voltage applied to the load to restore the desired voltage level.

4 Claims, 5 Drawing Figures

AUTORESONANT STATIC CONVERTER

BACKGROUND OF THE INVENTION

My invention pertains to static converters for use particularly in high voltage applications. More specifically, the invention pertains to a static converter arrangement which includes a resonant regulating element, an output level detector, and a control circuit for varying the operating frequency of the inverter to regulate the output voltage.

Under certain types of use, static voltage converters must meet predetermined specifications as to output levels. For example, static device converters used on board railroad vehicles, particularly electric locomotives, must provide essentially constant output voltage in spite of appreciable variations in direct current input voltage and load requirements. Various arrangements to stabilize the converter output characteristics have been proposed and used, e.g., the so-called chopper devices. All these arrangements have disadvantages and operational difficulties. For example, switching losses in chopper devices increase greatly as input voltage rises. Also harmonic components fed back to the source, i.e., a railroad electric distribution system, become large at high voltages. Thus an improved regulation means for static converter apparatus is a pressing need.

Accordingly, an object of my invention is to provide converter apparatus capable of maintaining substantially constant output characteristics over large variations in the direct current input voltage with substantially constant energy transfer.

Another object of the invention is a static converter supplying, from a source of direct current voltage which may vary over considerable range, a substantially constant output voltage of a different level.

A still further object of my invention is a static converter arrangement with an inverter network having two branches with controlled static switching means alternately actuated to conducting condition by a control circuit means which sets the inverter frequency by the triggering rate of the static devices, and which further includes regulator means in the inverter output circuit to vary the load voltage level as the frequency of the output varies and a level detector means to vary the triggering rate of the control circuit means as variations in the output voltage are detected.

Yet another object of the invention is a high voltage inverter arrangement with an output regulator means for peaking the output voltage at the resonant frequency of the regulator, a level detector for sampling the output voltage level, and a feedback signal network for applying a signal, in accordance with any detected variation in the output level, to the inverter control for varying the trigger frequency of the controlled static switches of the inverter to adjust the output voltage to a predetermined level.

Other objects, features, and advantages of the invention will become apparent from the following description and appended claims when taken with the accompanying drawings.

SUMMARY OF THE INVENTION

According to the invention, the output of the inverter portion of a static converter is passed through a resonant circuit network which is tuned to the selected operating frequency of the inverter to maximize the output voltage. The output voltage applied to the load is also measured by a known level detector device to register any variation from a predetermined correct level. Signals indicating the amount of variation from the predetermined load voltage are applied to the inverter control network to vary the operating frequency and thus cause a change in the output voltage by the resonant circuit. By this feedback loop, the output voltage at the load is adjusted back to the predetermined level.

As specifically shown, the regulator means is a series LC circuit connected to the inverter output and with the load connected in parallel with, i.e., connected across, the capacitor element. The inverter arrangement in each of the two illustrated forms uses controlled static switching devices, e.g., of the well-known thyristor type shown as controlled rectifier elements. In addition to a resistive load for the inverter, the load connected to the capacitor of the regulator means may be the primary of a transformer whose secondary output is rectified to complete the converter as a static transformer type which provides a DC to DC conversion, the output being at a different voltage level. The level of the output applied to the load is still monitored by the detector means to register variations from the desired level. The registered variation from the normal is applied to control the inverter network switching frequency. Of the two specific forms shown for the inverter portion of the converter, one is similar to and the other a modified version of the static inverter disclosed in the U.S. Pat. No. 3,760,258, issued Sept. 18, 1973 to Marcello Percorini, Vittorio DiNunzio, and Giuseppe Careglio. This prior art inverter is further modified by addition of the regulator means to assure substantially constant output characteristics.

BRIEF DESCRIPTION OF THE DRAWINGS

Prior to defining the invention in the appended claims, I shall describe two specific converter circuit arrangements and a modification of each, as illustrated in the accompanying drawings, in which:

In each of the drawings, the same or similar reference characters are used to designate similar parts of the apparatus.

DESCRIPTION OF THE ILLUSTRATED EMBODIMENTS

Figure 1:
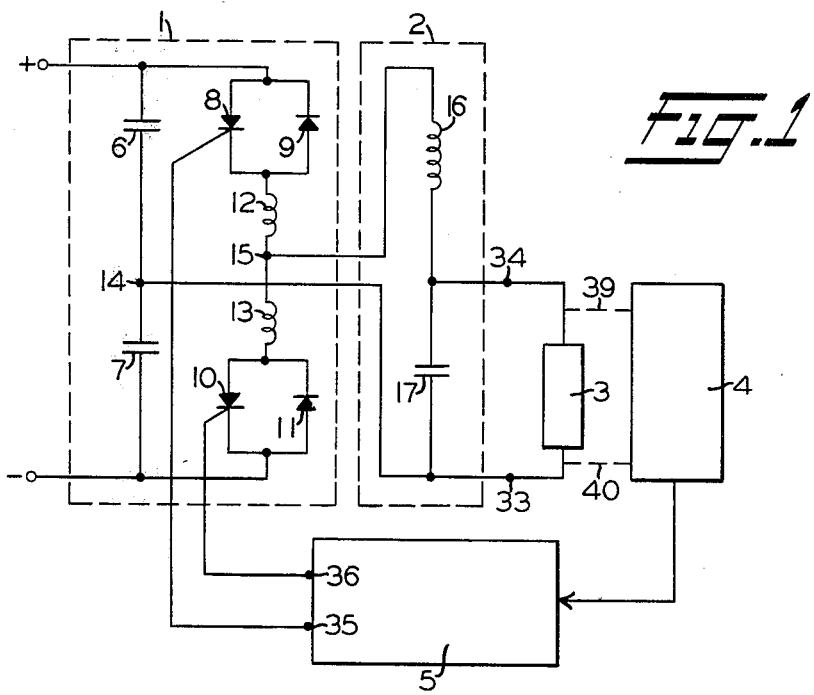
FIG. 1 is a schematic circuit diagram illustrating a first form of static converter, embodying the output regulator means of my invention, used as an inverter device to supply a constant alternating current output.

Referring to the drawings, FIG. 1 shows a static converter arrangement which here functions as an inverter device. The arrangement includes an inverter circuit element or network enclosed by the dashed block 1 which has two input terminals + and − across which is applied a direct current (DC) voltage with the indicated polarity. A regulator element or means, enclosed by the dashed block 2, comprises an LC series resonant circuit which is connected across the output of inverter 1. A load conventionally indicated by the block 3 is connected to the output terminals 33 and 34 of regulator 2. Briefly, the inverter circuit 1 transforms the DC input voltage, in a manner to be described, into an alternating current (AC) voltage of essentially square wave shape which is applied to the input leads of the series resonant path of regulator 2. The output of regulator 2, which is applied to load 3, is an AC voltage with an effective value dependent upon the average value of the DC voltage applied to inverter 1.

Block 4 represents a level detection circuit network, of any known type, coupled in the required manner to load 3, as indicated by dashed lines 39 and 40. Level detector 4 detects variations in the effective value of the AC voltage at the input to load 3 and supplies an output signal indicative of the amount of variation from a predetermined level or range of desired load input. This signal is applied to a control circuit network, shown by block 5, which emits, at its output terminals 35 and 36, control signals capable of setting and/or varying, as will be described, the frequency of the square wave voltage output of inverter 1.

The inverter circuit network 1 includes two capacitors 6 and 7, of equal value, connected in series across the input terminals. The network also includes a first thyristor device 8 connected in parallel with oppositely poled diode 9 and a second thyristor device 10 connected in parallel with oppositely poled diode 11. The thyristor devices, here and in other drawing figures, are shown for convenience as silicon controlled rectifiers (SCR). It will be understood that other gated switching devices, including properly controlled transistors, providing similar operating characteristics may be used. However, the descriptive term thyristor will be used for these elements throughout this description. A first and a second inductor 12 and 13, respectively, are connected in series with the two parallel connected thyristor-diode pairs across the inverter input terminals in multiple with capacitors 6 and 7. The common terminal 14 between the two capacitors and the common terminal 15 of inductors 12 and 13 are the output terminals of inverter element 1. The outputs 35 and 36 of conventionally shown control circuit 5 actuate alternate triggering of thyristors 8 and 10, respectively, at a preselected nominal frequency so that an essentially square wave AC voltage appears across terminals 14 and 15 during operation. Control circuit 5 may be similar to control circuit UC shown in the previously cited U.S. Pat. No. 3,760,258, particularly FIG. 2 thereof. For the arrangements shown in FIGS. 1 and 2 of this application, this control circuit will be modified since only two triggering outputs are needed. The signal from detector element 4 will be used, as will be evident shortly, to vary the frequency of the relaxation oscillator PG of the prior patent unit.

Figure 5:
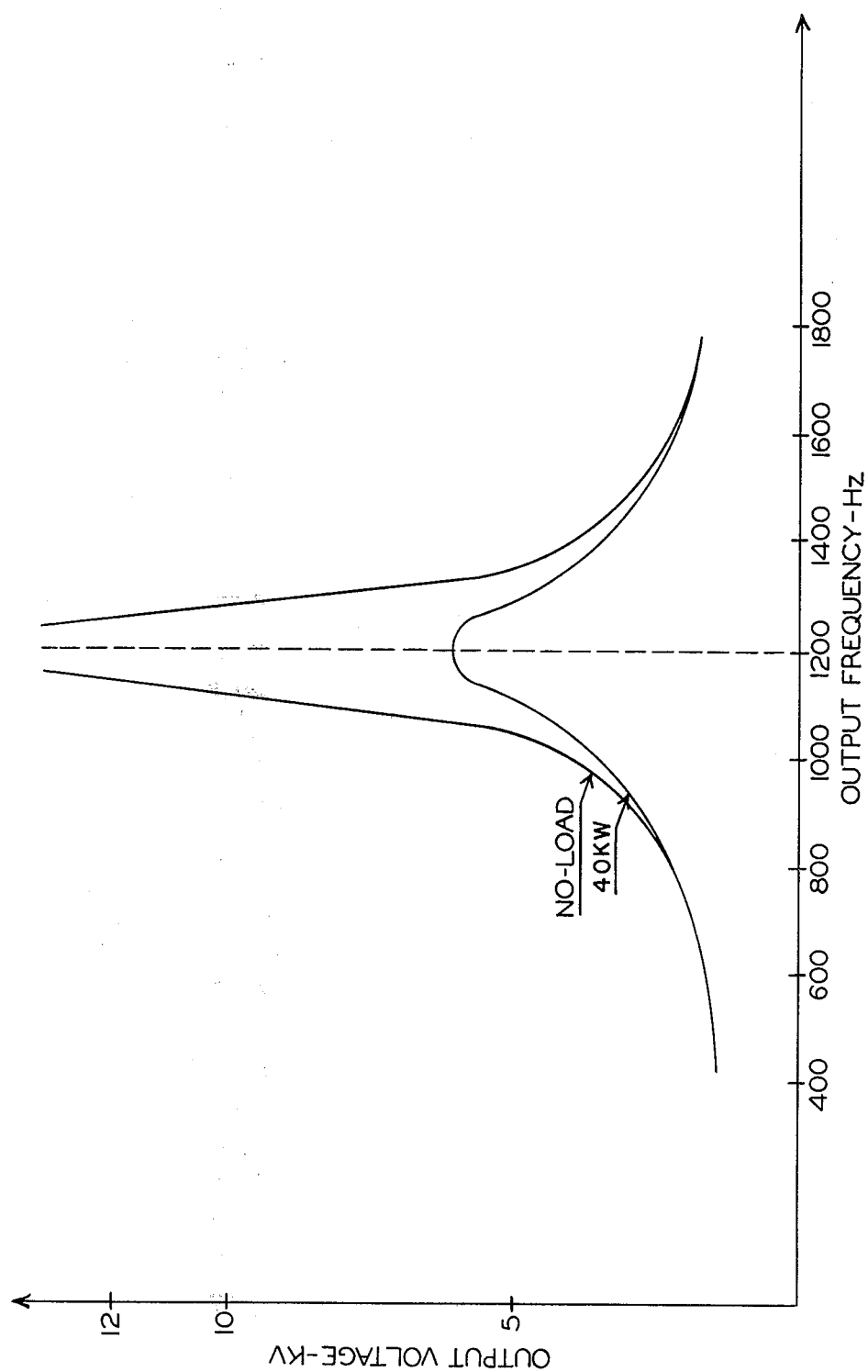
FIG. 5 is a chart useful in explaining the operating principle of the regulator device.

The resonant circuit or regulator 2 includes an inductor 16 connected in series with capacitor 17, with the series path connected across the output terminals 14 and 15 of inverter 1. The output terminals 33 and 34 of the whole converter arrangement across which load 3 is connected are the same as the terminals of capacitor 17. As is known, an LC series resonant circuit is characterized by a transfer function of frequency in the form of a field centered around the resonance frequency. If the AC signal applied to the input of regulator 2 has a frequency that varies in a band close to the resonance frequency of the LC circuit, the amplitude of the AC voltage supplied at output terminals 33 and 34 is dependent upon the frequency of the input from terminals 14 and 15 of inverter 1. In other words, if the frequency at which inverter 1 is being driven by control circuit 5 is close to the resonance frequency of regulator 2, the output voltage at terminals 33 and 34 may be varied, to overcome variation in the DC input voltage, by changing the frequency of the alternate signals at outputs 35 and 36 of control circuit 5. A specific example is shown in the chart of FIG. 5 for a 40 KW inverter circuit supplied with a DC input of 3 KV and with the resonant frequency of regulator 2 set at 1200 Hz, for both no load and full load conditions.

Variations in the level of the output voltage supplied to load 3 during operation are registered by the level detector circuit 4. This detector may be coupled to load 3 in any appropriate manner, e. g., directly connected in parallel with the load or by inductive coupling. When a variation from the predetermined desired level of the load supply is detected, circuit 4 supplies a signal representing the amount and direction of variation to control circuit 5 which varies the frequency at which circuit 5 alternately actuates thyristors 8 and 10. The frequency of the square wave output signal from inverter 1 is shifted so that the output voltage from regulator 2 is varied in a direction to restore the desired voltage level supplied to load 3. Thus the inverter arrangement of FIG. 1 automatically varies the level of the AC voltage supplied to the load to compensate for variations in the DC voltage input or for variations in the load itself. It is also to be noted that inductors 12 and 13 are useful for increasing the off-time, i. e. non-conducting time, of thyristors 8 and 10.

Figure 2:
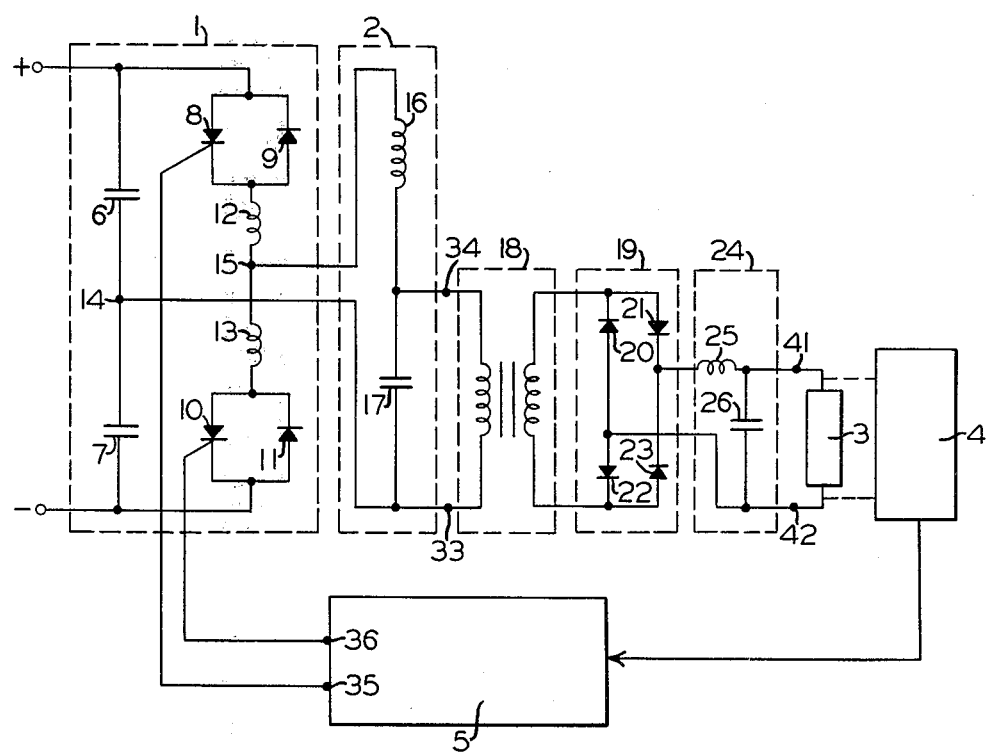
FIG. 2 shows a modification of the circuit of FIG. 1 to provide a full direct current to direct current conversion.

FIG. 2 shows a static converter arrangement similar to that of FIG. 1 but modified to be used as a static transformer for converting an input DC voltage to an output DC voltage of another level. For ease of comparison, corresponding elements in FIG. 2 are given the same reference as in FIG. 1. Thus references 1 and 2 designate an inverter circuit and an LC series resonant regulator identical in construction and interconnection to those elements in FIG. 1. However, connected across the output terminals of regulator 2 is the primary winding of a coupling transformer 18, which thus receives the AC output voltage from the inverter 1 through regulator 2. The secondary winding of transformer 18 is connected to the input of full wave rectifier device 19 which is shown as comprising diodes 20, 21, 22, and 23 connected in conventional bridge configuration. Rectifier 19 supplies at its output a DC voltage to a conventional smoothing or filter circuit 24 which consists of inductor 25 and capacitor 26. The load 3 is then connected across output terminals 41 and 42 of filter 24 with detector 4 coupled to load 3.

Operation of the initial elements of the FIG. 2 converter is similar. Inverter circuit 1 transforms the DC voltage applied to its input terminals into a square wave AC voltage at terminals 14 and 15. The frequency of this voltage is established and varied by control circuit 5. This AC voltage is applied to regulator 2 which supplies at its output terminals 33 and 34 an AC voltage whose level or value is dependent upon the frequency of the inverter output. The output of regulator 2 is applied to the primary of transformer 18 which raises or lowers the voltage level induced in the secondary in accordance with the winding ratio. The transformer output is rectified in unit 19 which supplies its DC output voltage, smoothed by filter 24, to load 3 at terminals 41 and 42. The average of the load voltage depends upon the effective value of the voltage applied to the input of transformer 18.

If, during operation, because of variations in the DC voltage supplied to inverter 1 or because of changes in load 3, the voltage at terminals 41 and 42 changes, level detector circuit 4 registers the change and supplies an output signal indicative of the nature of the variation. This signal, as in FIG. 1, is applied to control circuit 5 and is capable of varying the frequency at which thyristors 8 and 10 are alternately actuated. This varies the frequency of the AC signal supplied by inverter 1 to regulator 2. Consequently, the point of operation of this resonant circuit is shifted along its characteristic curve (e. g., FIG. 5), thereby causing a variation in the voltage supplied to the input of transformer 18. This voltage variation, through transformer 18, rectifier 19, and filter 24, becomes a variation in the DC voltage at terminals 41 and 42 essentially equal in level and of opposite sign to that detected by circuit 4.

Figure 3:
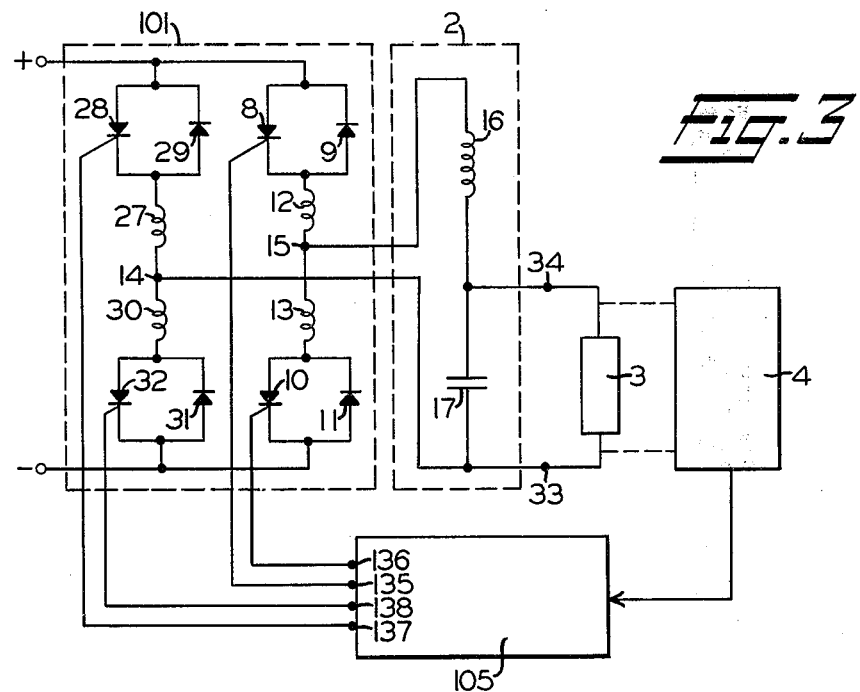
FIG. 3 illustrates diagramatically a second form of the static inverter arrangement also embodying the output regulation of the invention.

A modification of the converter of FIG. 1, and again used as a static inverter, is shown in FIG. 3, where elements exactly corresponding are designated by the same references. However, the reference 101 designates the dashed block enclosing the inverter circuit, which differs from inverter 1 and is of the known bridge type. Specifically, capacitor 6 is replaced by an inductor 27 connected in series with the parallel paths through oppositely poled thyristor 28 and diode 29. Similarly, capacitor 7 is replaced by inductor 30 connected in series with the paralleled but oppositely poled thyristor 32 and diode 31. Block 105 indicates conventionally a control circuit, at times responsive to signals from detector 4, which is capable of supplying signals, over its outputs 135 to 138, to alternately actuate or trigger the thyristor pairs 8, 32 and 10, 28. This alternate triggering of the thyristor pairs produces a square wave AC voltage across the output terminals 14 and 15 of inverter 101. The inverter network within block 101 is thus quite similar to that shown in the cited U.S. Pat. No. 3,760,258. Control circuit 105 may be identical with the equivalent network in FIG. 2 of this prior patent except for the frequency variation supplied from circuit 4. Except for the bridge operation within the inverter network 101, operation of the static converter/inverter arrangement of FIG. 3 is identical in concept to that previously described for the arrangement of FIG. 1. That is, the feedback of a signal from level detector 4, when a variation from the predetermined or desired voltage level applied to load 3 is detected, varies the rate at which the control circuit 105 actuates the thyristor pairs in inverter element 101. This shifts the frequency of the AC voltage supplied to regulator 2 which adjusts the output or load voltage accordingly to restore the desired level.

Figure 4:
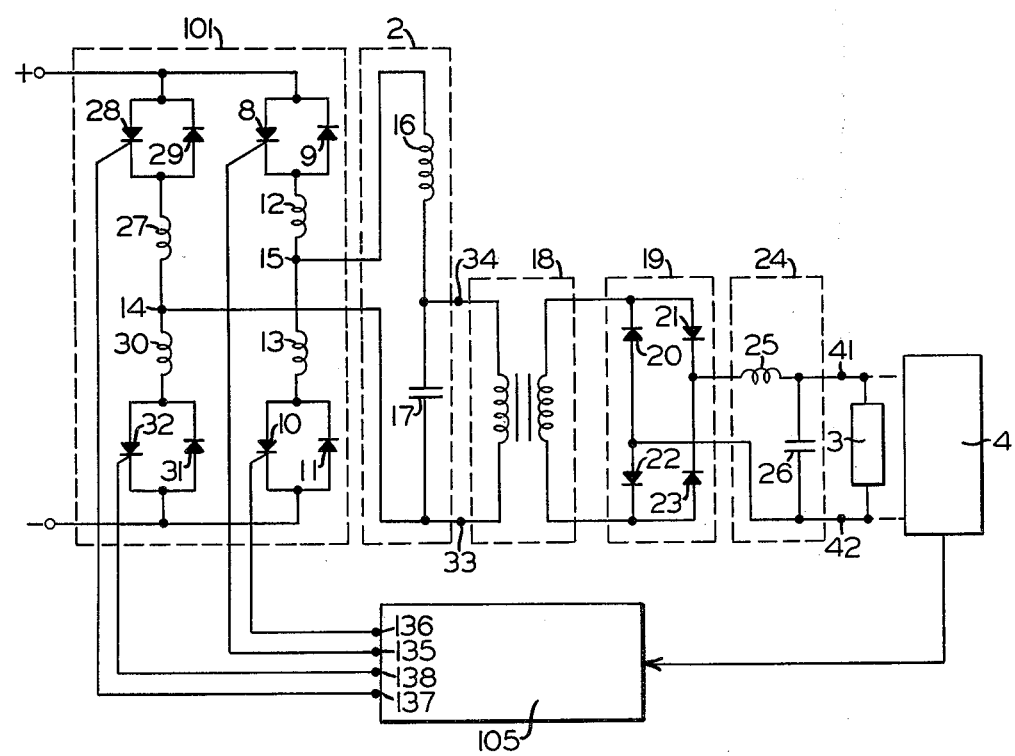
FIG. 4 shows a modification of the FIG. 3 inverter arrangement to provide, as in FIG. 2, a direct current voltage converter.

The arrangement of FIG. 3 is modified in FIG. 4 to provide a converter to be used as a static transformer for DC voltages. The arrangement of FIG. 4 differs from the static transformer of FIG. 2 only in the replacement of inverter 1 and control circuit 5 with inverter 101 and control circuit 105, respectively, from FIG. 3. With this difference, the operation of the converters of FIGS. 2 and 4 are conceptually the same.

The converter arrangement of the invention thus provides regulation to maintain the output voltage applied to a load at a predetermined level in spite of variations in the input DC voltage or load requirements. This is accomplished in a simple manner by adding a resonant circuit network at the output of the inverter element which varies the output voltage in accordance with the inverter operating frequency and a level detector to supply a feedback signal indicating variation from the desired load supply voltage. The inverter operating frequency is varied by the feedback signal so that the resonant regulator varies the output to restore the load voltage. An efficient and economic static converter arrangement with a regulated output results.

Although I have herein shown and described but two static inverter arrangements and corresponding modifications for static transformer operation, it is to be understood that various other changes and modifications within the scope of the appended claims may be made without departing from the spirit and scope of my invention.

Having thus described the invention, what I claim as new and desire to secure by Letters Patent, is:

1. Static converter apparatus for transforming a direct current voltage from a source into another voltage of different level to supply a load with a predetermined voltage level, comprising,
(a) a static inverter network coupled to receive the direct current voltage from said source and operable for transforming that voltage into an alternating current voltage,
(b) control means coupled for driving said inverter network to normally produce said alternating current voltage at a selected frequency,
(c) an LC series resonant regulator circuit tuned to said selected frequency and coupled to receive said alternating current voltage from said inverter network and responsive for varying an output voltage level as the frequency shifts from said selected frequency,
(d) output means coupled across the capacitor element of said series regulator circuit for supplying said output voltage to said load, and
(e) a level detector means coupled to said output means for detecting variations of the supplied output voltage from said predetermined level and responsive thereto for generating a feedback signal representative of the variation,
(f) said control means also coupled to said level detector means and responsive to reception of a feedback signal for shifting the frequency of the alternating current voltage produced by said inverter network so that said resonant regulator circuit varies said output voltage to adjust the load voltage to said predetermined level.

2. Static converter apparatus as defined in claim 1 in which,
(a) said static inverter network comprises a first and a second static switching channel,
(b) said control means is coupled to said first and second switching channels to alternately actuate the channels into conducting condition normally at said selected frequency rate,
(c) each channel is connected in series with said regulator circuit across said source whereby current alternately flows through said regulator LC series resonant circuit in opposite directions as said switching channels are alternately actuated.

3. Static converter apparatus as defined in claim 1 or 2 in which said output means connects said load directly across said capacitor element of said series resonant regulator circuit to receive said alternating current of controlled frequency.

4. Static converter apparatus as defined in claim 1 or 2 in which said output means comprises,
(a) a coupling transformer with a primary winding connected across said capacitor element of said series resonant circuit,
(b) a full-wave rectifier means with input coupled to a secondary winding of said transformer,
(c) a smoothing filter means,
(d) and in which said load and said level detector means are coupled by said smoothing filter to the output of said rectifier means.

* * * * *